United States Patent Office 3,368,943
Patented Feb. 13, 1968

3,368,943
α-ALKOXYISOBUTYRATES AND α-HALO-β-ALKOXYISOVALERATES IN PERFUMES AND CLEANING PRODUCTS
Allan H. Gilbert, 200 Beechwood Road, Oradell, N.J. 07649, and Ronald Ross Winnegrad, 1493 E. Terrace, West Englewood, N.J. 07666
No Drawing. Filed Oct. 20, 1965, Ser. No. 498,990
20 Claims. (Cl. 167—94)

ABSTRACT OF THE DISCLOSURE

This specification is concerned with certain α-alkoxyisobutyrates and α-halo-β-alkoxyisovalerates which are perfumes and is concerned with products having these perfumes therein.

---

The present invention relates to a perfume. More particularly, it is concerned with a cleaning product containing this perfume.

It is known that certain synthetic products may be used as perfumes. It is also known to include a perfume in a cleaning product, such as a dishwasher product. When the cleaning product contains a chlorine-releasing agent, however, the perfume may not be satisfactory since it may not overcome the pungent odor resulting from the use of this product. An unsaturated perfume, for example, may lose its odoriferous properties and stability because the unsaturation is attacked by the chlorine-releasing agent.

It has now been discovered that certain alkoxy-substituted isoalkanoates have perfumy properties and are suitable for use in cleaning products including products having chlorine-releasing agents. The compounds within the purview of a first embodiment of the invention have the following generic structure:

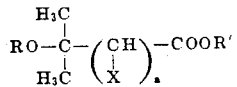

wherein $a$ is 0 or 1; X is chlorine or bromine; R is methyl or ethyl; and R′ is a saturated $C_4$ to $C_{12}$ aliphatic chain linear or branched, benzyl, phenylethyl or phenylpropyl. The compounds of the invention, therefore, include α-alkoxyisobutyrates, i.e., when $a$ is 0, and α-halo-β-alkoxyisovalerates, i.e., when $a$ is 1. Preferred compounds are as follows: isobutyl α-methoxyisobutyrate; n-amyl α-methoxyisobutyrate; n-hexyl α-methoxyisobutyrate; phenylethyl α-methoxyisobutyrate; n-butyl α-ethoxyisobutyrate; n-amyl α-ethoxyisobutyrate; n-hexyl α-ethoxyisobutyrate; isobutyl α-bromo-β-methoxyisovalerate; n-hexyl α-bromo-β-methoxyisovalerate; and n-hexyl α-chloro-β-methoxyisovalerate.

It is critical for the success of this invention for R in the aforementioned structure to be methyl or ethyl. If R is a higher alkyl, e.g., n-propyl, isopropyl and n-butyl, a desirable perfume is not obtained.

Any acceptable method may be used to prepare a perfume within the scope of the invention. Generally, the perfume is provided by reacting the appropriate α-alkoxyisobutyric acid or α-halo-β-alkoxyisovaleric acid with the appropriate alcohol under known conditions of esterification. An alternate method is the transesterification of an α-alkoxyisobutyrate or α-halo-β-alkoxyisovalerate with a suitable alcohol.

When one of the aforementioned acid reactants is employed, it may also be prepared by any acceptable method. For example, the compound, α-ethoxyisobutyric acid, may be formed by reacting chloroform, acetone, ethanol and caustic soda. The compound, α-bromo-β-methoxyisovaleric acid may be formed by reacting bromine, methanol and dimethylacrylic acid.

In a second embodiment of the invention, one or more of the perfumes heretofore described may be incorporated into a cleaning product, such as a dishwasher formulation, to overcome the strong odor resulting from any chlorine-releasing compounds therein. Besides the perfume and chlorine-releasing agent, a cleaning product generally has a soap or a non-soap detergent and a phosphate. As defined herein, a cleaning product is a substance or a composition which removes undesirable dirt, food particles, stains or the like or which renders an item unsoiled. This, therefore, includes dishwashing compounds, dry bleaches, scouring cleansers, light-duty detergents, heavy-duty detergents, pelleted detergents, soap products and scouring pads.

With respect to the perfume content, it depends upon the specific perfume and the type of cleaning product. Generally, the perfume of the invention is employed in an amount up to about 0.5 part, preferably between about .0005 to .25 part, per 100 parts by weight of the total cleaning product (phcp.).

When used, any chlorine-releasing agent known in the art is suitable. A chlorine-releasing agent is defined herein as a chlorine-containing compound which liberates chlorine under conditions normally used for cleaning purposes. Satisfactory chlorine-releasing agents among others are as follows: chlorocyanurates, chlorinated trisodium phosphate, N-chlorosuccinimide, calcium hypochlorite, and N,N-dichloroazocarbonamidine. The range of chlorine-releasing agents is usually about 0.5 to 40 parts (phcp.).

The soaps and non-soap detergents, which are generally found in the cleaning products of this invention, are well known in the art (Chemistry of Organic Compounds, Noller (1951), pp. 186–90; College Chemistry, Smith (1947), pp. 431–2 and 455). Any known soap or non-soap detergent is applicable, such as sodium lauryl sulfate, sodium alkyldiphenyloxide, alkali metal salts of fatty acids and the wetting agents disclosed in U.S. Pat. No. 2,263,948 which is incorporated herein by reference. The range of soaps or detergents may be about 0.5 to 80 parts (phcp.).

An alkali metal phosphate is usually included in a cleaning product of the invention. This terminology defines a well known class of compounds used in cleaning compositions (U.S. Pat. No. 2,310,475). The orthophosphates, pyrophosphates, polyphosphates and metaphosphates are applicable to the present invention. The range of phosphates, e.g., sodium tripolyphosphate, may be about 1 to 80 parts (phcp.).

In this invention, a soil-suspending agent, such as sodium carboxymethylcellulose and polyvinyl alcohol, may be added to certain types of products within the range of about 0.2 to 1.0 part (phcp.). The following ingredients may be used: other perfume compounds in combination with the perfumes of the invention; abrasives, e.g., silica; metallic strands (for scouring pads); silicates; carbonates; and borates.

The preferred ranges for the various ingredients in different product are indicated in Table 1.

TABLE 1

| | Preferred Range, Percent* | | | |
|---|---|---|---|---|
| | In Dishwashing Compositions | In Dry Bleach | In Heavy Duty Detergents | In Scouring Cleansers |
| Soaps or Nonsoap Detergents | | | | |
| Sodium lauryl sulfate | 1-2 | 2-4 | 10-20 | 2-3 |
| Pluronic L-61 [a] | 3-4 | 2-4 | 8-10 | 4-5 |
| Pluronic L-62 [b] | 3-4 | 2-4 | 8-10 | 4-5 |
| Sodium alkyldiphenyloxide sulfonate | 0.6-0.8 | 2-4 | 8-10 | 4-5 |
| Soap | 3-4 | 2-4 | 40-80 | 4-5 |
| Soil-Suspending Agents: | | | | |
| Sodium carboxymethyl-cellulose | | | 0.3-0.5 | |
| Sodium carboxymethyl hydroxy ethyl cellulose | | | 0.3-0.5 | |
| Sodium cellulose sulfate | | | 0.3-0.5 | |
| Polyvinyl alcohol | | | 0.3-0.5 | |
| Polyethylene glycols | | | 0.3-0.5 | |
| Chlorine-Releasing Agents | | | | |
| Trichlorocyanuric acid | 8-10 | 8-10 | 4-8 | 8-10 |
| Sodium and Potassium dichlorocyanurate | 14-16 | 14-16 | 5-10 | 14-16 |
| Dichlorodimethylhydantoin | 14-16 | 14-16 | 5-10 | 14-16 |
| N-chlorosuccinimide | 14-16 | 14-16 | 5-10 | 14-16 |
| Trichloromelamine | 14-16 | 14-16 | 5-10 | 14-16 |
| Calcium hypochlorite | 14-16 | 14-16 | 4-8 | 14-16 |
| Chlorinated trisodium phosphate | 8-10 | 8-10 | 4-8 | 8-10 |
| Chloramine-T [c] | 14-16 | 14-16 | 5-10 | 14-16 |
| N,N-dichloro-azocarbonamidine | 14-16 | 14-16 | 5-10 | 14-16 |
| Phosphates: | | | | |
| Sodium tripolyphosphate | 40-50 | 5-20 | 40-50 | 5-10 |
| Sodium pyrophosphate | 40-50 | 5-20 | 40-50 | 5-10 |
| Sodium hexametaphosphate | 40-50 | 5-20 | 40-50 | 5-10 |
| Sodium tetraphosphate | 40-50 | 5-20 | 40-50 | 5-10 |
| Sodium trimetaphosphate (soluble) | 40-50 | 5-20 | 40-50 | 5-10 |
| Abrasives: | | | | |
| Silica | | | | 85-95 |
| Volcanic ash | | | | 85-95 |
| Diatomaceous earth | | | | 85-95 |
| Pumice | | | | 85-95 |
| Alumina | | | | 85-95 |
| Feldspar | | | | 85-95 |
| Carborundum | | | | 85-95 |
| Fine metallic particles [d] | | | | |
| Metallic strands [d] | | | | |
| Plastic web [d] | | | | |
| Other: | | | | |
| Sodium metasilicate | 10-15 | 4-8 | 4-8 | 1-3 |
| R U-silicate [e] | 10-15 | 4-8 | 4-8 | 1-3 |
| N-silicate [f] | 10-15 | 4-8 | 4-8 | 1-3 |
| G-silicate [g] | 10-15 | 4-8 | 4-8 | 1-3 |
| Sodium carbonate | 5-10 | 5-10 | 5-15 | 3-10 |
| Sodium tetraborate | 5-10 | 5-10 | 5 15 | 3-10 |
| Sodium sesquicarbonate | 5-10 | 5-10 | 5-15 | 3-10 |
| Sodium sulfate (to 100%) | | | | |

*Percentages are based upon cleaning compound before perfume o invention is added thereto.
[a] Empirical formula HO(C₃H₄O)ₐ(C₃H₆O)ᵦ(C₂H₄O)ₓH wherein b is selected to provide a mol. wt. of propylene oxide of 1750 and a+c is an integer to provide 10% ethylene oxide in the molecule
[b] Empirical formula HO(C₃H₄O)ₐ(C₃H₆O)ᵦ(C₂H₄O)ₓH wherein b is elected to provide a mol. wt of propylene oxide of 1750 and a+c is an integer to provide 20% ethylene oxide in the molecule.
[c] Sodium derivative of N-chloro-p-toluene sulfonamide
[d] Used in scouring pads.
[e] Sodium silicate solution; SiO₂:Na₂O = 2.4:1
[f] Sodium silicate solution; SiO₂:Na₂O = 3.25:1
[g] 85% sodium silicate solids; SiO₂:Na₂ = 3.22:1.

The aforementioned compounds of the invention may also be employed to perfume cleaning compositions without any chlorine-releasing agents therein. These compositions include liquid detergent formulations, soaps and toiletry products, especially those that are neutral or alkaline. Furthermore, a bleaching-type product may be formed which contains only a perfume of the invention and a chlorine-releasing agent.

As described heretofore, a perfume of the present invention may be used alone in various products. However, it is used preferably in combination with other perfumes as a perfume blend. A suitable composition, for example, may be provided by blending 1 to 50 parts of one of the alkoxyisoalkanoates mentioned above with 100 parts of other perfumy materials. Any known perfumes may be used in the blend with the compounds of the invention. As defined herein, "a perfume" is a substance, natural or synthetic, that emits a pleasant fragrance, i.e., an agreeable odor, which is usually a fluid preparation used for scenting. This includes the following compounds among others: coumarin, eucalyptol, borneol, methyl amyl ketone, linolyl acetate, linalol and mixtures thereof. The preferred blends have a lavender-like odor.

Thus, in accordance with this invention, new perfumes have been provided. Furthermore, cleaning products have been provided containing chlorine-releasing agents and the aforementioned perfumes, and these cleaning products can be used without the formation of an objectionable odor.

The following examples are submitted to illustrate but not to limit this invention. Unless otherwise indicated, all parts and percentages in the specification are based on weight.

Example I

The compound, n-hexyl α-ethoxyisobutyrate, was prepared by adding chloroform (167.5 g., 1.4 mole) dropwise over a 4 hour period to a cooled, stirred slurry of sodium hydroxide (233 g., 5.8 mole), acetone (750 g., 12.9 mole) and ethanol (46 g., 1 mole). The mixture therefrom was refluxed for 2 hours and most of the acetone was removed subsequently by distillation. The residue was dissolved in hot water, filtered and evaporated to near dryness. The resulting residue was acidified with 25% sulfuric acid and ether extracted twice. The combined ether extracts were washed with brine, dried over anhydrous magnesium sulfate and distilled to form 34.2 g. (18.4%) α-ethoxyisobutyric acid (B. 90–112° C./18 mm.).

The α-ethoxyisobutyric acid reactant was then esterified with excess n-hexanol by refluxing in xylene containing p-toluene-sulfonic acid. After distilling through the spinning band column, 29.7 g. (10%) pure n-hexyl α-ethoxyisobutyrate (B. 111–115° C./12 mm.) was provided. The n-hexyl α-ethoxyisobutyrate was a perfume with a lavender-like note.

Example II

Compounds 1–6 indicated in Table 2 were prepared in the same manner as described in Example I except that the appropriate reactants were employed. Compound 7 in Table 2 is the compound prepared in Example I.

TABLE 2

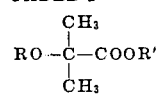

| Compound | R | R' |
|---|---|---|
| 1 | CH₃ | (CH₃)₂CHCH₂ |
| 2 | CH₃ | CH₃(CH₂)₄ |
| 3 | CH₃ | CH₃(CH₂)₅ |
| 4 | CH₃ | φCH₂CH₂ |
| 5 | CH₃CH₂ | CH₃(CH₂)₃ |
| 6 | CH₃CH₂ | CH₄(CH₂)₄ |
| 7 | CH₃CH₂ | CH₂(CH₂)₅ |

All of the above compounds had perfumy properties and they were suitable for incorporation into a cleaning product containing a chlorine-releasing agent.

Example III

Compounds 1–8 indicated in Table 3 were also prepared as in Example I except for varying the reactants.

TABLE 3

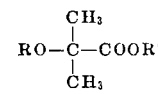

| Compound | R | R' |
|---|---|---|
| 1 | (CH₃)₂CH | n-Butyl |
| 2 | (CH₃)₂CH | n-Amyl |
| 3 | (CH₃)₂CH | n-Hexyl |
| 4 | CH₃CH₂CH₂ | n-Amyl |
| 5 | CH₃CH₂CH₂ | Isoamyl |
| 6 | CH₃CH₂CH₂ | n-Hexyl |
| 7 | CH₃(CH₂)₃ | n-Propyl |
| 8 | CH₃(CH₂)₃ | n-Butyl |

The compounds in Table 3 were not useful as perfumy materials.

Examples I, II and III show the criticality of having a methoxy or ethoxy substituent in order to provide desirable perfumes.

*Example IV*

The compound, n-hexyl α-chloro-β-methoxyisovalerate, was prepared by adding chlorine to a solution of methanol and dimethylacrylic acid at a temperature of 10° C. After 2.5 hours, the mixture was acidified with HCl and stirred overnight. The methanol was vacuum distilled until two layers appeared. The two layers were then ether extracted and the ethereal layer was washed with KHCO₃ solution. The water layer was acidified with HCl and then concentrated under vacuum until the neutral salt began to appear. The aqueous layer was ether extracted, washed with salt solution, dried and concentrated to form α-chloro-β-methoxyisovaleric acid. The α-chloro-β-methoxyisovaleric acid reactant was esterified subsequently as described in Example I. The resulting n-hexyl α-chloro-β-methoxyisovalerate was a perfume with a lavender-like note.

*Example V*

Compounds 1 and 2 listed in Table 4 were formed by following the same procedure described in Example IV except that the reactants were varied as required. The compound prepared in Example IV is compound 3 in Table 4.

TABLE 4

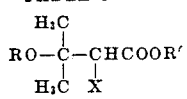

| Compound | R | X | R' |
|---|---|---|---|
| 1 | CH₃ | Br | (CH₃)₂CHCH₂ |
| 2 | CH₃ | Br | CH₃(CH₂)₅ |
| 3 | CH₃ | Cl | CH₃(CH₂)₅ |

The compounds in Table 4 had useful perfumy properties and were suitable for incorporation into a cleaning product having a chlorine-releasing agent therein.

*Example VI*

A milled toilet soap bar was formed from a fat charge composed of 80% tallow and 20% coconut oil saponified with sodium hydroxide. Soap chips were then provided from this saponified fat charge with the following perfume blend (0.1%) incorporated therein: n-hexyl α-ethoxyisobutyrate of Example I (5 parts), coumarin (2 parts), eucalyptol (5 parts), borneol (20 parts), methyl amyl ketone (10 parts), linalyl acetate (200 parts) and linalol (450 parts). After subsequent milling, plodding and stamping, a soap bar was formed.

The soap bar of this example had an acceptable note of artificial lavender.

*Example VII*

Dry chlorinated bleaches in which the perfume odor during storage is not affected by the chlorine-releasing agents may be formed with the following ingredients therein

| Ingredient | Parts A | Parts B | Parts C |
|---|---|---|---|
| Isobutyl α-methoxyisobutyrate | 0.10 | | |
| Phenylethyl α-methoxyisobutyrate | | 0.10 | |
| n-Hexyl α-chloro-β-methoxyisovalerate | | | 0.10 |
| Sodium fatty alcohol sulfate | 2.1 | | 2.1 |
| Potassium dichlorotriazinetrione | 16.7 | 16.7 | |
| Sodium tripolyphosphate | 36.2 | 36.2 | 36.2 |
| Sodium silicate | 0.4 | 0.4 | 0.4 |
| Sodium sulfate | 44.4 | 44.4 | 44.4 |
| Sodium alkylbenzenesulfonate ᵃ | | 2.1 | |
| Halane ᵇ | | | 16.7 |

ᵃ Primarily a 1:1 mixture of alkylbenzene sulfonates in which the alkyl portion is a polypropylene group and has an average of 12 and 15 carbon atoms respectively.
ᵇ Dichlorodimethylhydantoin.

*Example VIII*

A dishwasher product which loses none of its perfume odor during storage may be provided with 0.1% n-amyl α-ethoxyisobutyrate and the ingredients shown herebelow:

| Ingredient | Parts |
|---|---|
| Sodium tripolyphosphate | ᵃ 44.00 |
| Chlorinated trisodium phosphate | ᵃ 9.60 |
| N-silicate ᵇ | ᵃ 7.414 |
| RU-silicate ᶜ | ᵃ 5.878 |
| Pluronic L62 ᵈ | 2.25 |
| Pluronic L61 ᵉ | 0.75 |
| Colorants | 0.004 |
| Water | 30.104 |

ᵃ Expressed on dry basis.
ᵇ Sodium silicate solution: SiO₂:Na₂O=3.25:1.
ᶜ Sodium silicate solution: SiO₂:Na₂O=2.4:1.
ᵈ Empirical formula HO(C₂H₄O)ₐ(C₃H₆O)ᵦ(C₂H₄O)cH wherein b is selected to provide a mol. wt. of propylene oxide of 1750 and a+c is an integer to provide 20% ethylene oxide in the molecule.
ᵉ Empirical formula HO(C₂H₄O)ₐ(C₃H₆O)ᵦ(C₂H₄O)cH wherein b is selected to provide a mol. wt. of propylene oxide of 1750 and a+c is an integer to provide 10% ethylene oxide in the molecule.

*Example IX*

The following liquid detergent formulation may be perfumed with 0.1% isobutyl α-bromo-β-methoxyisovalerate whereby the perfume odor is unaffected during storage.

| Composition | Percent |
|---|---|
| Potassium dodecylbenzenesulfonate | 10 |
| Sodium xylenesulfonate | 8 |
| LDA ᵃ | 2.7 |
| LIPA ᵇ | 3.0 |
| Potassium pyrophosphate | 18.0 |
| Sodium silicate | 2.5 |
| CMC ᶜ | 0.15 |
| Methocel ᵈ | 0.57 |
| Water (to 100%) | |

ᵃ Lauric/myristic diethanol amide.
ᵇ Lauric/myristic isopropanol amide.
ᶜ Sodium carboxymethylcellulose
ᵈ Methylcellulose.

*Example X*

The scouring cleanser-type formulation indicated herebelow may be perfumed with 0.1% n-hexyl α-methoxyisobutyrate whereby the perfume odor is unaffected during storage.

| Composition | Parts |
|---|---|
| Silica, 90 mesh | 70 |
| Chlorinated trisodium phosphate | 10 |
| Sodium alkylbenzene sulfonate | 3.33 |
| Sodium tripolyphosphate | 16.67 |

Having set forth the general nature and specific embodiments of the present invention, the true scope is now particularly pointed out in the appended claims.

What is claimed is:

1. A perfume blend comprising about 1% to 50% of a perfume having the structure:

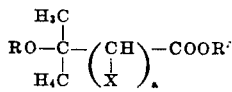

wherein $a$ is 0 or 1; X is chlorine or bromine; R is methyl or ethyl; and R' is a saturated $C_4$ to $C_{12}$ aliphatic chain linear or branched, benzyl, phenylethyl or phenylpropyl with 100 parts of other perfumy materials.

2. A composition comprising a chlorine-releasing agent selected from the group consisting of trichlorocyanuric acid, chlorocyanurates, chlorinated trisodium phosphate, N-chlorosuccinimide, calcium hypochlorite, N,N-dichloroazocarbonamidine, dichlorodimethylhydantoin, trichloromelamine and sodium derivative of N-chloro-p-toluene sulfonamide and about .0005% to .25% of a perfume having the structure:

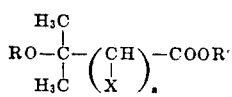

wherein $a$ is 0 or 1; X is chlorine or bromine; R is methyl or ethyl; and R' is a saturated $C_4$ to $C_{12}$ aliphatic chain linear or branched, benzyl, phenylethyl or phenylpropyl.

3. A cleaning composition comprising a soap or a non-soap detergent and about .0005% to .25% of a perfume having the structure:

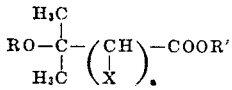

wherein $a$ is 0 or 1; X is chlorine or bromine; R is methyl or ethyl; and R' is a saturated $C_4$ to $C_{12}$ aliphatic chain linear or branched, benzyl, phenylethyl or phenylpropyl 4. The composition according to claim 3 in which the composition is a soap bar.

5. The composition according to claim 3 in which the perfume is isobutyl α-methoxyisobutyrate.

6. The composition according to claim 3 in which the perfume is n-amyl α-methoxyisobutyrate 7. The composition according to claim 3 in which the perfume is n-hexyl α-methoxyisobutyrate.

8. The composition according to claim 3 in which the perfume is phenylethyl α-methoxyisobutyrate.

9. The composition according to claim 3 in which the perfume is n-butyl α-ethoxyisobutyrate.

10. The composition according to claim 3 in which the perfume is n-amyl α-ethoxyisobutyrate.

11. The composition according to claim 3 in which the perfume is n-hexyl α-ethoxyisobutyrate 12. The composition according to claim 3 in which the perfume is isobutyl α-bromo-β-methoxyisovalerate.

13. The composition according to claim 3 in which the perfume is n-hexyl α-bromo-β-methoxyisovalerate.

14. The composition according to claim 3 in which the perfume is n-hexyl α-chloro-β-methoxyisovalerate.

15. A cleaning composition comprising a soap or a non-soap detergent; an alkali metal phosphate; a chlorine-releasing agent selected from the group consisting of trichlorocyanuric acid, chlorocyanurates, chlorinated trisodium phosphate, N-chlorosuccinimide, calcium hypochlorite, N,N-dichloroazocarbonamidine, dichlorodimethylhydantoin, trichloromelamine and sodium derivative of N-chloro-p-toluene sulfonamide; and about .0005% to 0.25% perfume having the structure:

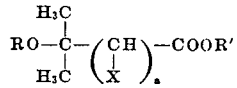

wherein $a$ is 0 or 1; X is chlorine or bromine; R is methyl or ethyl; and R' is a saturated $C_4$ to $C_{12}$ aliphatic chain linear or branched, benzyl, phenylethyl or phenylpropyl.

16. A soap bar comprising a sodium soap of 80% tallow and 20% coconut oil and 0.1% of a perfume blend containing 5 parts n-hexyl α-ethoxyisobutyrate, 2 parts coumarin, 5 parts eucalyptol, 20 parts borneol, 10 parts methyl amyl ketone, 200 parts linalyl acetate and 450 parts linalol.

17. A dishwasher composition comprising sodium tripolyphosphate; chlorinated trisodium phosphate; a sodium silicate containing a $SiO_2:Na_2O$ ratio of 2.4; a sodium silicate containing a $SiO_2:Na_2O$ ratio of 3.25; a first detergent compound with an empirical formula $HO(C_2H_4O)_a(C_3H_6O)_b(C_2H_4O)_c$ wherein $b$ is selected to provide a molecular weight of 1750 for propylene oxide and $a+c$ is an integer selected to provide about 10% ethylene oxide in the molecule; a second detergent compound with an empirical formula $$HO(C_2H_4O)_a(C_3H_6O)_b(C_2H_4O)_c$$

wherein $b$ is selected to provide a molecular weight of 1750 for propylene oxide and $a+c$ is an integer selected to provide about 20% ethylene oxide in the molecule; and a perfume having the structure:

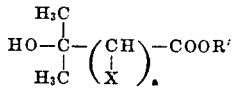

wherein $a$ is 0 or 1; X is chlorine or bromine; R is methyl or ethyl; and R' is a saturated $C_4$ to $C_{12}$ aliphatic chain linear or branched, benzyl, phenylethyl or phenylpropyl.

18. A compound having the structure:

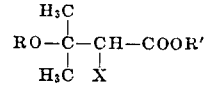

wherein X is chlorine or bromine; R is methyl or ethyl; and R' is a saturated $C_4$ to $C_{12}$ aliphatic chain linear or branched, benzyl, phenylethyl or phenylpropyl.

19. The compound according to claim 18 which is isobutyl α-bromo-β-methoxyisovalerate, n-hexyl α-bromo-β-methoxyisovalerate or n-hexyl α-chloro-β-methoxyisovalerate.

20. Phenylethyl α-methoxyisobutyrate.

References Cited

UNITED STATES PATENTS

| | | | |
|---|---|---|---|
| 2,490,109 | 12/1949 | Weizmann | 260—484 X |
| 2,525,249 | 10/1950 | Weizmann | 260—514 |
| 2,816,921 | 12/1957 | Gardner | 260—535 |
| 2,824,133 | 2/1958 | McElhill | 260—484 X |
| 3,259,641 | 7/1966 | Castro | 260—484 X |
| 3,267,133 | 8/1966 | Hagemeyer et al. | 260—486 |

ALBERT T. MEYERS, *Primary Examiner.*

VERA C. CLARKE, *Assistant Examiner.*

UNITED STATES PATENT OFFICE
CERTIFICATE OF CORRECTION

Patent No. 3,368,943                      February 13, 1968

Allan H. Gilbert et al.

It is hereby certified that error appears in the above numbered patent requiring correction and that the said Letters Patent should read as corrected below.

Column 3, line 5, "product" should read -- products --; line 51, "o" should read -- of --; line 55, "elected" should read -- selected --. Column 4, TABLE 2, third column, line 6 thereof, "$CH_4(CH_2)_4$" should read -- $CH_3(CH_2)_4$ --. Column 5, line 71, "lavender" should read -- lavandin --. Column 7, lines 4 to 7, that portion of the formula reading $H_4C|$     should read     $H_3C|$ Column 8, lines 33 to 36, the left-hand portion of the formula reading HO—     should read     RO—

Signed and sealed this 19th day of August 1969.

(SEAL)
Attest:

EDWARD M. FLETCHER, JR.              WILLIAM E. SCHUYLER, JR.
Attesting Officer                         Commissioner of Patents